April 7, 1942.  W. E. HART  2,278,876
FISHING FLY
Filed Nov. 28, 1939
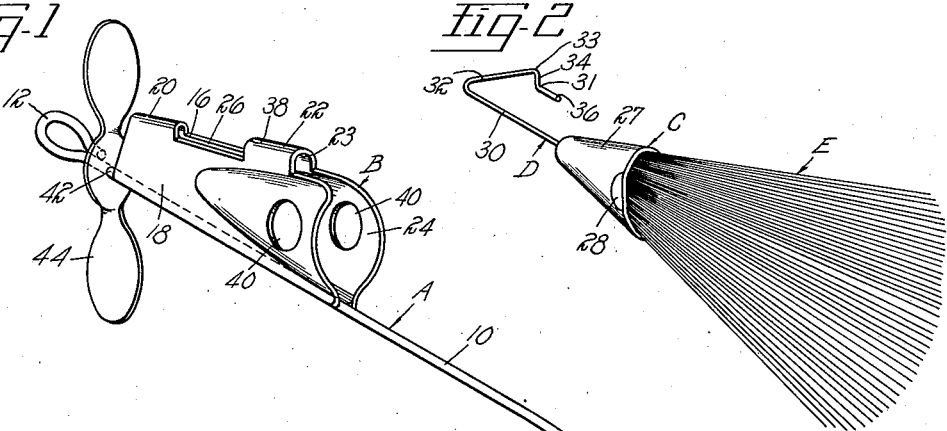
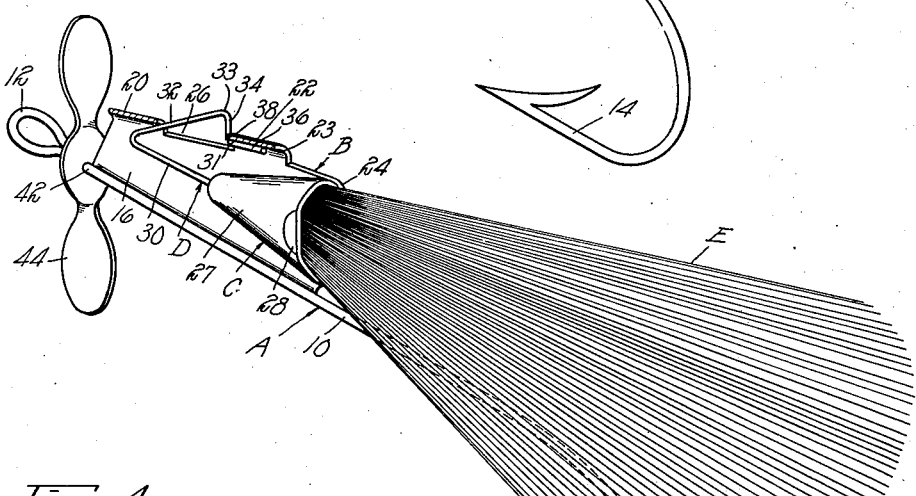
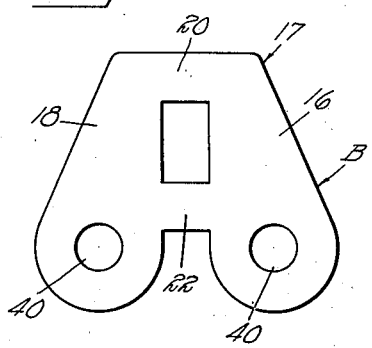
Inventor
WILLIAM E. HART
By Lindsey & Robillard
Attorneys Patented Apr. 7, 1942

2,278,876

UNITED STATES PATENT OFFICE 2,278,876

FISHING FLY

William E. Hart, West Hartford, Conn.

Application November 28, 1939, Serial No. 306,485

9 Claims. (Cl. 43—42)

The present invention relates to improvements in artificial flies and more particularly to the type of fly comprising a hook and streamer and wherein the hook and streamer are readily detachable from one another.

Heretofore artificial flies have been manufactured wherein it is possible to detach the streamer from the hook and replace it with another streamer. However, so far as applicant is aware, it has always been necessary to either remove and replace one or more holding means or to remove the fly from the fishing line in order to permit the removal of the streamer. The former type is objectionable in that the parts are easily lost and the device cumbersome, and the latter type is objectionable inasmuch as it requires cutting of a piece of expensive fishing line and fine wrapping of the streamer on the holding means is required.

The object of the present invention is to provide an artificial fly having none of the disadvantages of those heretofore manufactured and wherein a plurality of streamers may be interchangeably used with a single hook without the necessity of separable securing means and the removal of the hook from the line.

A still further object is an artificial fly wherein the streamer and hook have cooperating supporting means for releasably holding the streamer in position on the hook and when so held the streamer is rigidly secured to the hook.

A still further object is a fly of extremely simple construction, utilizing a minimum number of parts, and which may be readily and economically manufactured.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing:

Figure 1 is a perspective view of a hook with streamer receiving member thereon;

Fig. 2 is a perspective view of a streamer and the streamer holding means;

Fig. 3 is a perspective view of the hook and streamer in assembled position with part of the streamer receiving member in section to more clearly show the cooperating interlocking means;

Fig. 4 is a detail view of the streamer receiving member prior to being shaped into completed form.

Referring to the drawing, there is shown a fishing hook A of usual construction comprising an elongated shank portion 10 reversed upon itself at its upper end to provide a line receiving eye 12 and terminating at its lower end in a reversed hook portion 14.

In accordance with the invention herein, there is mounted on the shank 10 adjacent the upper end thereof a streamer receiving member B adapted to receive a streamer carrying member C in which there is secured a streamer E; the member C having thereon a resilient catch or latching member D adapted to cooperatively engage with portions of the sleeve B to releasably secure the streamer in position.

For convenience in manufacture, the streamer receiving member B may be initially stamped from a suitable piece of metal into blank 17 (see Fig. 4) having oppositely disposed, substantially trapezoidal shaped wall defining portions 16 and 18 joined together by connecting tabs 20 and 22. The stamping is then bent along the center line of the tab portions to position the walls 16 and 18 parallel to, but spaced from, one another, and with the free edges thereof in alignment. By the use of a suitable die the lower portion of the wall members are given a conical curvature to define a conical cap positioning sleeve 24. The free edges of the wall members 16 and 18 are then spaced to either side of the hook shank and joined thereto, such as by soldering or electric welding. When so mounted on the shank there is defined between the tongues 20 and 22 a wall slot 26 extending axially of the member B and adapted to cooperate with the clamping means D to securely hold the streamer in position, as hereinafter becomes apparent, and the bent over tab 22 defines an inner guideway 23 for guiding the latching means into proper position.

In order to be properly received within the streamer receiving member B, the streamer holding member C comprises a conical cap 27 adapted to fit snugly within the conical sleeve portion 24 of member B. The cap 27 has secured therein the streamer E, which may be made of feathers, silk strands, horse hair, or any of the other materials commonly accepted by fishermen as suitable for the purposes intended. To properly secure same in the cap 27 the streamer elements are joined together at one end and the joined end inserted into suitable cement previously placed within the cap 27. If desired, the lower periphery of the cap may thereafter be peaned inwardly as at 28 to further secure the streamer therein.

As indicated, the latching member or catch D is secured to the cap member 27 and comprises a suitable piece of resilient wire extending forwardly from the apex of the cap to provide a shank 30 and then reversed upon itself to provide a rearwardly extending tongue 32 arranged at an acute angle to the shank 30 and defining therewith an inverted V. The lower extremity of the tongue 32 joins with a right angle restraining hook 31 including a downwardly extending restraining shoulder 34 and a rearwardly extending limiting finger 36 arranged at right angles to the shoulder. In forming the latching member, the acute angle between the shank 30 and the tongue 32 is such that the normal spacing between the shank 30 and the limiting finger 36 is greater than the distance between the axial center line of the conical sleeve portion 24 of the member B and the inner surface of the tab 22, thus requiring a flexing of the tongue 32 towards the shank 30 to permit its insertion within the member B.

With the streamer holder C and the clamping member D so constructed, upon insertion of same within the streamer receiving member B the conical sleeve portion 24 of the member B will position the cap C centrally of the sleeve, and the parallel wall portions 16 and 18 thereof will align the latching member D with the wall slot 26. As the cap is moved forwardly, the tongue 32, upon passing beneath the tab 22, will be sprung inwardly until it reaches alignment with the slot 26, whereupon due to the natural resiliency of the latching member, the tongue will spring outwardly to extend through the slot and the downwardly facing restraining shoulder 34 will engage the upwardly extending shoulder 38 at one end of the slot, and the restraining finger 36 will engage behind the tab 22 thus interlocking the parts together.

When so inserted, the streamer will be held firmly in place, but may readily be released by pressing down on the nose portion 33 of the tongue 32 extending through the slot 26 until the hook 31 is released from behind the shoulder 38, whereupon the streamer may be readily removed. Thus, a plurality of streamers may be interchangeably used with the one hook.

In order to add to the reality of the device so that it more closely resembles a minnow or the like, the streamer receiving member B may have cut therein oppositely disposed openings 40 through which portions of the streamer holding cap C will be exposed. By making the cap C of a color or metal which contrasts with the color or metal of the streamer receiving member B, the portion of the cap showing through the openings will give the effect of a pair of eyes; this being understood by most fishermen to add considerably to the efficacy of the device. Furthermore, by positioning the upper end of the sleeve member B slightly below the line receiving eye 12, the straight portion 42 therebetween may be utilized as a bearing upon which there may be mounted a spinner 44. The spinner functions upon being dragged through the water to set up an illusion of motion, and thus the fly more closely resembles the movements of live bait.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A fishing fly comprising a hook having a shank, a sleeve secured to said shank, a streamer carrying cap receivable in said sleeve, and cooperating means on said cap and said sleeve automatically engageable upon inserting the cap in the sleeve for releasably securing said cap within the sleeve.

2. A fishing fly comprising a hook having a shank, a sleeve secured to said shank and having a slot therein, a streamer carrying cap receivable in said sleeve, and resilient latching means on said cap and having a portion extending outwardly of said slot for releasably securing said cap within said sleeve.

3. A fishing fly comprising a hook having a shank, a sleeve secured to said shank, said sleeve having a slot therein and an upwardly extending shoulder at one end of said slot, a streamer carrying cap receivable in said sleeve, and resilient latching means carried by said cap and comprising a hook having a downwardly extending shoulder engaging said sleeve shoulder and a limiting finger extending rearwardly from said latching means shoulder and positioned against the inner face of the sleeve below the slot for releasably securing said cap within said sleeve.

4. A fishing fly comprising a hook, a sleeve secured to said hook, said sleeve having a slot therein and a restraining shoulder at one end of said slot, a streamer carrying cap receivable in said sleeve, and latching means comprising a V-shaped resilient member including a shank secured to the cap and extending rearwardly therefrom, and a tongue connected to the shank and extending through said slot and terminating in a hook engageable with said restraining shoulder.

5. A fishing fly comprising a hook, a streamer receiving member carried by the hook, a streamer carrying member insertable within said receiving member, and positive interlocking means carried by said receiving member and said carrying member automatically engageable upon insertion of the carrying member within the receiving member for releasably securing the carrying member therein.

6. In a fishing fly, a streamer receiving member, a streamer carrier insertable in said receiving member, a spring actuated latching member on said carrier, and cooperating means on said receiver engageable by said latching member upon insertion of the carrier within the receiving member.

7. A fish lure of the character described, comprising a hook, an imitation fly having a head thereon, a connector on said hook, a socket in said connector adapted to receive said head; the wall of said socket having an opening therethrough for showing the color of said head therethrough to simulate the eye of a fly.

8. A fish lure of the character described comprising a hook, an imitation fly, a head on said fly, a socket on said hook for receiving said head, and spring means for detachably locking said fly to said hook.

9. A fish lure comprising a hook, a fly, and means comprising a spring operated hook-shaped detent for detachably securing said fly to said hook.

WILLIAM E. HART.